United States Patent
Sauter et al.

(10) Patent No.: US 7,757,832 B2
(45) Date of Patent: Jul. 20, 2010

(54) PARKING LOCK FOR A MOTOR VEHICLE

(75) Inventors: Bernhard Sauter, Tettnang (DE);
Gerhard Hockl, Ravensburg (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 699 days.

(21) Appl. No.: 11/792,157

(22) PCT Filed: Sep. 13, 2005

(86) PCT No.: PCT/EP2005/009791

§ 371 (c)(1),
(2), (4) Date: Jun. 1, 2007

(87) PCT Pub. No.: WO2006/058571

PCT Pub. Date: Jun. 8, 2006

(65) Prior Publication Data

US 2008/0127772 A1    Jun. 5, 2008

(30) Foreign Application Priority Data

Dec. 2, 2004    (DE)    ............ 10 2004 058 332

(51) Int. Cl.
*B60T 1/06*    (2006.01)
*F16H 63/38*   (2006.01)

(52) U.S. Cl. .............. 192/219.5; 188/31; 188/69; 74/411.5; 74/577 S

(58) Field of Classification Search .......... 192/219.5
See application file for complete search history.

(56) References Cited

U.S. PATENT DOCUMENTS

| | | | | |
|---|---|---|---|---|
| 2,912,085 A | * | 11/1959 | De Lorean | ............ 192/219.5 |
| 3,373,850 A | * | 3/1968 | Helmer | ............ 192/219.5 |
| 4,120,383 A | * | 10/1978 | Kawamoto | ............ 188/31 |
| 4,722,427 A | | 2/1988 | Prumbaum et al. | |
| 5,685,406 A | | 11/1997 | Crum et al. | |
| 5,697,260 A | | 12/1997 | Rixon et al. | |
| 6,354,422 B1 | * | 3/2002 | Kim | ............ 192/219.5 |
| 2002/0184963 A1 | | 12/2002 | Champ et al. | |

FOREIGN PATENT DOCUMENTS

| | | |
|---|---|---|
| DE | 35 37 091 C1 | 4/1987 |
| DE | 195 35 239 C1 | 12/1996 |
| DE | 197 25 226 A1 | 1/1998 |
| DE | 198 34 075 A1 | 2/2000 |
| DE | 199 33 618 A1 | 1/2001 |
| DE | 102 45 951 A1 | 4/2004 |
| DE | 102 55 714 A1 | 6/2004 |
| EP | 0 540 298 A1 | 5/1993 |

* cited by examiner

*Primary Examiner*—Richard M. Lorence
(74) *Attorney, Agent, or Firm*—Davis & Bujold, P.L.L.C.

(57) ABSTRACT

A parking lock for a motor vehicle with an automatic or manual automatic transmission includes a parking lock wheel connected with the transmission output, a locking pawl pivotably attached by a parking lock bolt to a transmission housing. The locking pawl engages and disengages the parking lock wheel and has an end communicating with a guiding plate. A locking element is placed between the pawl and plate to prevent the pawl from disengaging the parking lock wheel. A hydraulic damping element, is at least operatively connected with the pawl, such that while disengaging the parking lock, movement of the pivotable end of the locking pawl toward the guiding plate is damped upon release of the parking lock thus preventing any undesired release jolt.

23 Claims, 7 Drawing Sheets

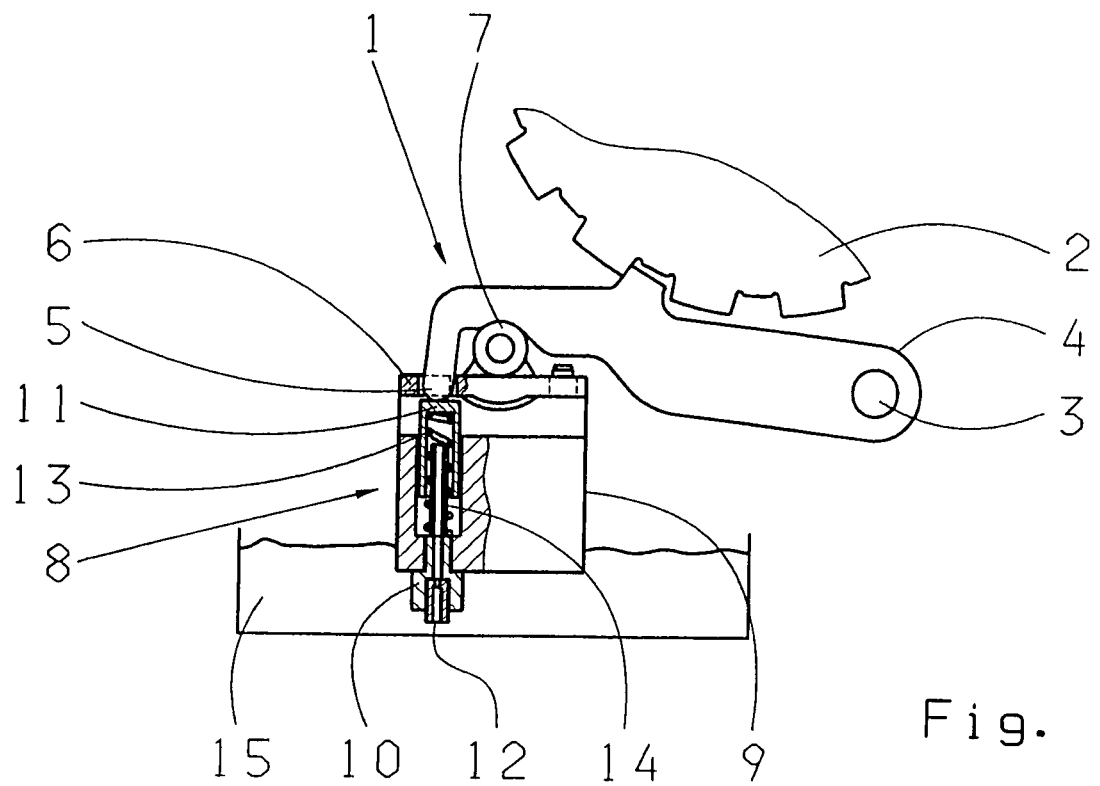
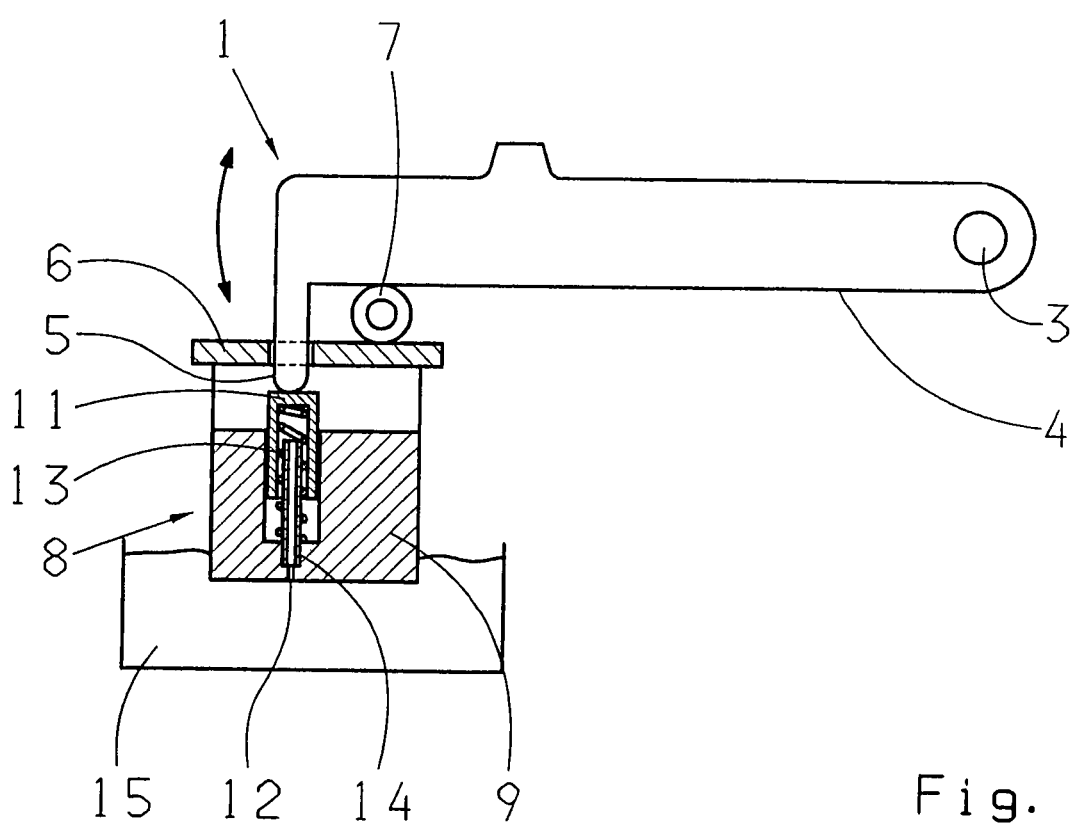

ual*US 7,757,832 B2*

PARKING LOCK FOR A MOTOR VEHICLE

This application is a national stage completion of PCT/EP2005/009791 filed Sep. 13, 2005 which claims priority from German Application Serial No. 10 2004 058 332.3 filed Dec. 2, 2004.

FIELD OF THE INVENTION

The present invention relates to a parking lock for a motor vehicle comprising an automatic transmission or an automatic manual transmission.

BACKGROUND OF THE INVENTION

Prior art parking lock mechanisms for automatic transmissions are well-known. These mechanisms usually include a pretensioned spring to activate the parking lock. The parking lock is typically deactivated by means of a linkage or a hydraulic or pneumatic cylinder. For this purpose, an operating rod of the linkage and/or a connecting rod of the cylinder actuates conjointly with a parking pawl and a parking gear.

From DE 35 37 091 C1, a parking lock is known and includes a parking gear, which is arranged rotationally fixed on the output shaft of the transmission, a pivotable parking pawl, which is movable between an idle and an active position meshing with the parking gear, a lever connected with the manual selector lever, which is connected with an operating rod, via an angled end, with a sliding sleeve opposite the operating rod that may be shifted against the force of an actuating spring. The sliding sleeve is provided with a tapered shoulder to shift the parking pawl from the idle position to the active position, and with a guide for the sliding sleeve in the housing. The end of the operating rod facing the sliding sleeve being upset shaped as a thickened part of the piston, which is shifted in a part of the cylinder of the sliding sleeve.

From U.S. Pat. No. 5,685,406 an arrangement of a parking lock is known, in which a transmission output shaft is connected, in a rotationally fixed manner, with a parking lock wheel, which includes a sort of spline shaft profile on its external diameter. A locking pawl is further provided, which radially meshes by positive locking with the spline shaft profile of the parking lock wheel when the parking lock is activated, thus locking the transmission output shaft. When the parking lock is disengaged, the locking pawl is released from engagement with the parking lock wheel by means of a mechanically operated mechanism, so that the parking lock wheel and/or the transmission output shaft is unlocked and the power train is no longer locked at the output end. The parking lock is likewise disengaged subject to the driver's selection, the driver having to place the selector lever from the parking position into another arbitrary selector lever position.

From DE 199 33 618 A1, by the applicant, a parking lock device for an automatic transmission is further known that comprises a parking lock wheel and a gearing. A locking pawl is engageable with the gearing, as the locking pawl is rotatable in the locked position when bound to a locking device disclosed as a locking cone. The locking cone is shiftably arranged against a spring mechanism on an element connecting with a slotted disk of a selector shaft.

When the parking lock is engaged, the locking pawl is biased into the gearing of the parking lock wheel, by the locking cone, and supported against the guiding plate. With the engaged parking lock, the locking pawl firms up, from the drive wheels, torque engaging the transmission on the output side. This torque is generated, for example, when a vehicle is parked uphill or downhill. In the forward drive direction and the downhill, force, meshing with the vehicle, is introduced to the powertrain on the output side. By locking the transmission output shaft, via the parking lock, the powertrain is held between the drive wheels and the parking lock. When the parking lock is disengaged, the locking pin is shifted in an axial direction, and the locking pawl, held as a consequence of the held power train, is released. In this process, a disadvantageous jolt occurs upon release: The locking pawl hits the guiding plate with its end opposite the parking lock bolt, producing an annoying, loud metallic noise. This noise propagates as an impact sound via the components that are in the force flow path of the locking pawl to the transmission housing and is irradiated outward as a bang, which, when added to the impact, is annoying.

To solve this problem, and/or reduce the noise generated when the parking lock is disengaged, a parking lock device for an automatic transmission is proposed within the scope of DE 102 45 951 A1 by the applicant, in which the parts connected with the transmission housing, i.e. the locking pawl, parking lock bolt and/or guiding plate, are acoustically decoupled by interposing spring and/or damping elements in the force flow.

In DE 102 45 951 A1, a parking lock is taught. A locking pawl, provided for locking a parking lock wheel, is pivotably arranged, via a bearing bolt, in a housing, and is shifted to communicate with a guiding plate, attached to the housing and is further arranged to be parallel to the bearing bolt axis. As a damping measure, it was proposed to acoustically decouple the locking pawl from the guiding plate by a spring arranged between them or a damping link arranged between them. If the locking pawl, previously positively meshing, with the parking lock wheel is pivoted out of this locking position, via an adequate actuating element, the spring and/or the damping element acts to prevent a direct metallic impact of the locking pawl on the guiding plate. Practical experience, however, has shown that when the locking pawl is disengaged from a state of high stress an impact noise still occurs, either by the impact of the spring on an allocated countersurface, locking of the spring, or impact of the damping link on an allocated countersurface, demonstrating that this type of measures is not sufficient to attenuate the release jolt such that, even under extreme vehicle operating conditions, it is not perceived as annoying by the driver.

Another measure for damping the release jolt occurring upon release of the positive locking of the parking lock is proposed in DE 102 45 951 A1. In this, the bearing bolt and/or parking lock bolt, on which the locking pawl of the parking lock is twistably and/or pivotably arranged in the housing, is not directly placed in the housing, but in a rubber sleeve, which is inserted into a corresponding recess and/or bore of the housing.

As a further measure for damping the release jolt occurring upon release of the positive lock of the parking lock is proposed in DE 102 45 951 A1. In this, the upper guiding plate of the parking lock system is acoustically decoupled from the housing by screwing the guiding plate to the housing damping links, such that there is no metallic contact between the guiding plate and housing. From practical experience, however, this type of elasticity has also shown to be insufficient to adequately dampen the noise occurring when the pawl strikes on the guiding plate, when the locking pawl is disengaged from a state of high stress.

From DE 195 35 239 C1, a parking lock is known in which the locking pawl and/or the parking lock wheel are of an elastic ductile design. From practical experience, however, this type of elasticity in the bearing of the locking pawl has a disadvantageous effect. Particularly on precision, when the parking lock is engaged, and also because it is subject to high wear and tear caused, in part, by considerable bearing loads.

Further, within the scope of DE 102 55 714 A1 by the applicant, a proposal is made to prevent the release jolt from occurring upon release of the positive lock of the parking lock, by additionally engaging the output, when the parking lock is activated, with at least connecting one friction locked switching element of the transmission, which is controllably disconnected only when the positive lock of the parking lock is released. However, this procedure disadvantageously requires a complex control device.

SUMMARY OF THE INVENTION

The task of the present invention is to disclose a parking lock for an automatic transmission of a motor vehicle, in which the release jolt, occurring upon release of the parking lock, is largely prevented without further control measures.

A parking lock is proposed comprising of a parking lock wheel connected with the transmission output, a locking pawl pivotably mounted on a parking lock bolt in a transmission housing, which engages with or disengages from the parking lock wheel and whose pivotable end is shifted into a guiding plate connected with the transmission housing, a locking element, which is located between the locking pawl and the guiding plate when in the engaged state, to prevent the locking pawl from being pushed out of a tooth gap of the parking lock wheel, in which a hydraulic damping element is provided, which operatively communicates with the locking pawl at least while the parking lock is disengaged, by means of which movement of the pivotable end of the locking pawl in the direction of the guiding plate is damped when the parking lock is released, thus preventing the above mentioned release jolt.

According to the present invention, the hydraulic damping element comprises a piston operatively connected with the locking pawl, which is shiftably arranged in a cylinder or cylinder bore so that movement of the locking pawl toward the guiding plate results in a relative movement of the bolt and the oil-filled cylinder towards each other, so that the oil in the cylinder is circulated through a fluid connection of a pipe and a throttling orifice and/or throttling bore into an oil sump. The damping level of the hydraulic damping element may be adjusted by adjusting the size of the orifice and/or throttle opening.

The pipe, enabling self-ventilation, is fastened in the cylinder by means of a screw or is pressed into the cylinder. In order to achieve self-ventilation, the hydraulic damping element is arranged such that the volume expelled by the piston is larger than the volume within the pipe when the parking lock is released.

According to the present invention, the orifice in the pipe may be provided on the screw, if the pipe is fastened by means of a screw, or bored directly into the cylinder as a throttling bore.

A further embodiment of the present invention proposes that the throttling bore is provided in the piston moved by the locking pawl, and that the transmission oil is supplied via a filling opening provided above the throttling bore in the cylinder and/or in the cylinder bore, the cylinder forming the damper housing and/or the cylinder bore being closed so as to prevent air from entering the piston space.

This ensures that, when the vehicle is steeply tilted, like, for example, on a slope, there is always enough oil available in the damping element guaranteeing effective damping.

If the piston is not connected with the locking pawl, the hydraulic damping element includes a compression spring arranged in the cylinder, which causes the piston to move outwardly when the parking lock is engaged, so that the cylinder may again be filled with oil from the oil sump.

Further described in the present invention a parking lock, in which damping of movement of the pivotable end of the locking pawl in the direction of the guiding plate is achieved by means of a viscous clutch and/or a rotatable viscous damper when the parking lock is released. Here, one side of the viscous damper is firmly rotatably connected with the housing and the other side is firmly connected with the locking pawl.

BRIEF DESCRIPTION OF THE DRAWINGS

The present invention will be described by way of example in more detail hereinafter with the attached drawings, the same components and/or components of comparable function being provided with the same reference numerals. The drawings show:

FIG. 1 is a schematic view of a first preferred embodiment of the parking lock according to the present invention;

FIG. 2 is a schematic view of a further preferred embodiment of the parking lock according to the present invention;

DETAILED DESCRIPTION OF THE DRAWINGS

Figure 3:
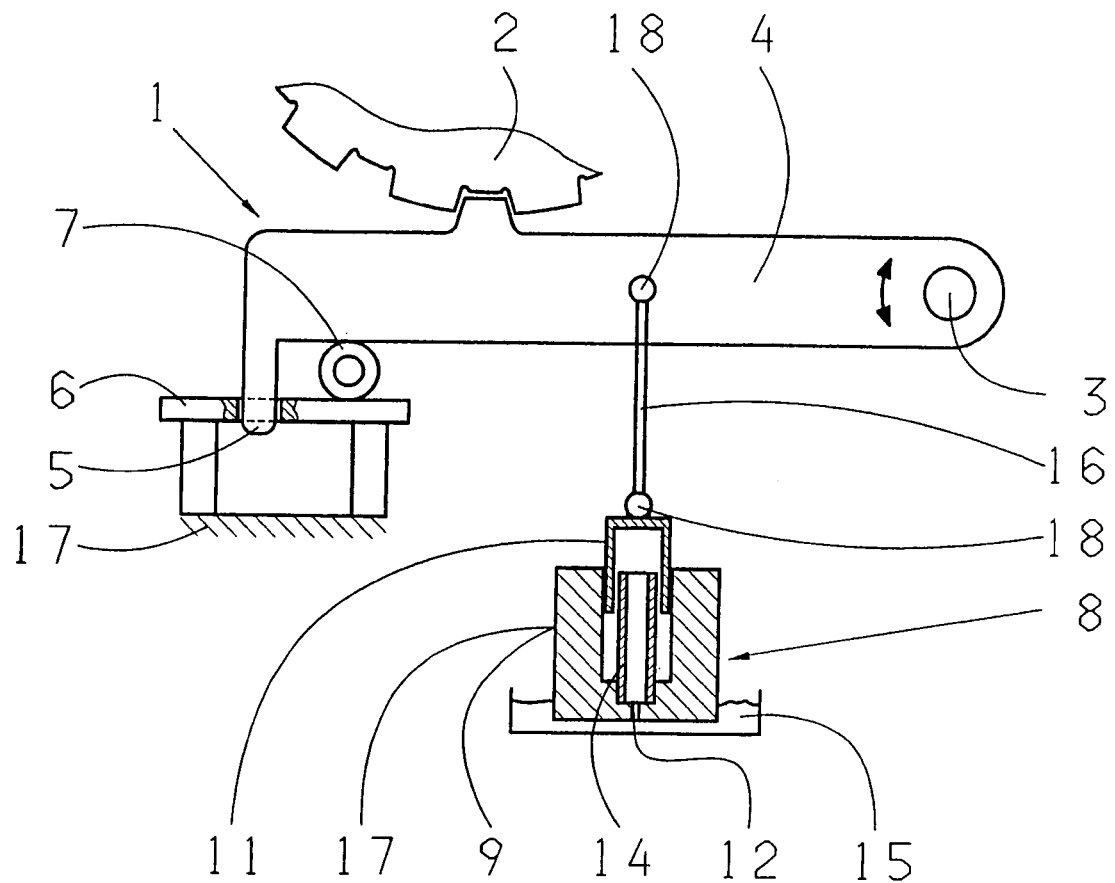
FIG. 3 is a schematic view of a third preferred embodiment of the parking lock according to the present invention.

In FIGS. 1 to 8 the parking lock according to the present invention is illustrated in the engaged state.

Pursuant to FIG. 1, the parking lock 1, according to the present invention, comprises a parking lock wheel 2 connected with the transmission output, a locking pawl 4 is pivotably mounted on a parking lock bolt 3 in a transmission housing to engage or disengage the parking lock wheel 2, and whose pivotable end 5 is shifted in a guiding plate 6, connected with the transmission housing. The parking lock 1 further comprises a locking element 7, configured as a locking cone in the illustrated exemplary embodiment, which is clamped between the locking pawl 4 and the guiding plate 6 in the engaged state, so as to prevent the locking pawl 4 from being pushed out of a tooth gap of the parking lock wheel 2. FIG. 1 accordingly shows the parking lock 1 in the engaged state.

As illustrated in FIG. 1, the parking lock according to the present invention comprises a hydraulic damping element 8, by means of which movement of the pivotable end 5 of the locking pawl 4 toward the guiding plate 6 is damped when the parking lock 1 is disengaged, thus preventing the release jolt described above.

The damping element 8 is fixed to the housing below the guiding plate 6, and within the scope of the illustrated embodiment, comprises a piston 11 in operative connection with the locking pawl 4, which is arranged to be shiftable against the force of a compression spring 13 located in a cylinder 9, which is connected, via a self-ventilating pipe 14 coupled to the cylinder by a screw 10, with an oil sump 15 so that the fluid connection between the cylinder and the oil sump 15 occurs, via the pipe 14 and screw 10. The end of the pipe 14 located in the oil sump, has an orifice 12 which is inserted into the screw 10 for example.

The mode of operation of the damping element 8 is as follows: When the parking lock 1 is disengaged, the locking cone 7 is shifted in the axial direction, such that the locking engagement between the locking pawl 4 and the parking lock wheel 2 is released. Subsequently, the end 5 of the locking pawl 4 pushes against the piston 11, which forces the oil in the cylinder through the pipe 14, the screw 10 and the orifice 12 into the oil sump 15. According to the present invention, the throttling effect of the orifice 12 prevents a "hard" impact of the locking pawl 4 on the guiding plate 6. By dimensioning the orifice bores, the damping and/or damping level may advantageously be adapted and adjusted to the transmission characteristics. With the return stroke, the cylinder 11 again fills with oil, while the pipe 14 effectuates self-ventilation of the damping element 8.

The compression spring 13 in the cylinder 9 biases the piston 11 outwardly when the parking lock 1 is engaged, thus filling the cylinder 9 with oil from the oil sump 15 again. The spring force further ensures firm engagement of the piston 11 on the locking pawl 4. In an advantageous further development of the present invention, the pivotable end 5 of the locking pawl 4 is convex to prevent canting of the piston 11 in the cylinder 9. After repeated operation of the parking lock 1, the system ventilates autonomously, for self-ventilation, the volume expelled by the piston 11 must be larger than the volume inside the pipe 14 and/or enclosed by the pipe 14.

The cylinder 9, pipe 14 and orifice 12 may, for example, also be designed as one piece. The damping element may further only include the cylinder 9, piston 11, pipe 14 and spring 13. In this case, the orifice 12 is directly bored into the cylinder as a throttling bore and the pipe 14 is fastened to and/or pressed into the cylinder 9. This embodiment is the subject matter of FIG. 2, in which the same components are designated with the same reference numerals.

In the exemplary embodiment according to FIG. 3, the piston 11 of the hydraulic damping element 8 is not in direct operative connection with the locking pawl 4; the piston 11 and the locking pawl 4 are connected with each other by a pivotable connection rod 16 and clearance free links 18. This mounting makes possible separation of the damping element 8 from the locking pawl 4. Accordingly, the embodiment with the connection rod 16 being a straight rod as illustrated in FIG. 3 should only be viewed as an example; of course, the geometry of this connection rod 16 may be adapted to the respective installation space conditions.

The layout of the damping element 8, illustrated in FIG. 3, corresponds to the layout shown in FIG. 2, i.e. the orifice 12 is bored directly into the cylinder 9 as a throttling bore, and the pipe 14 is fastened to and/or pressed into the cylinder 9. The layout of the damping element 8 according to FIG. 1 may also be taken if this is required by the constructive conditions.

The piston 11 of the hydraulic damping element 8 may be arranged directly in a bore serving as cylinder 9 in the housing 17 or in a separate cylinder 9 attached to the housing below the side of the locking pawl 4 facing the guiding plate 6. The firm connection between the locking pawl 4 and piston 11 as established by the clearance free links 18 and the connection rod 16 makes a spring inside the hydraulic damping element 8 unnecessary.

Figure 4:
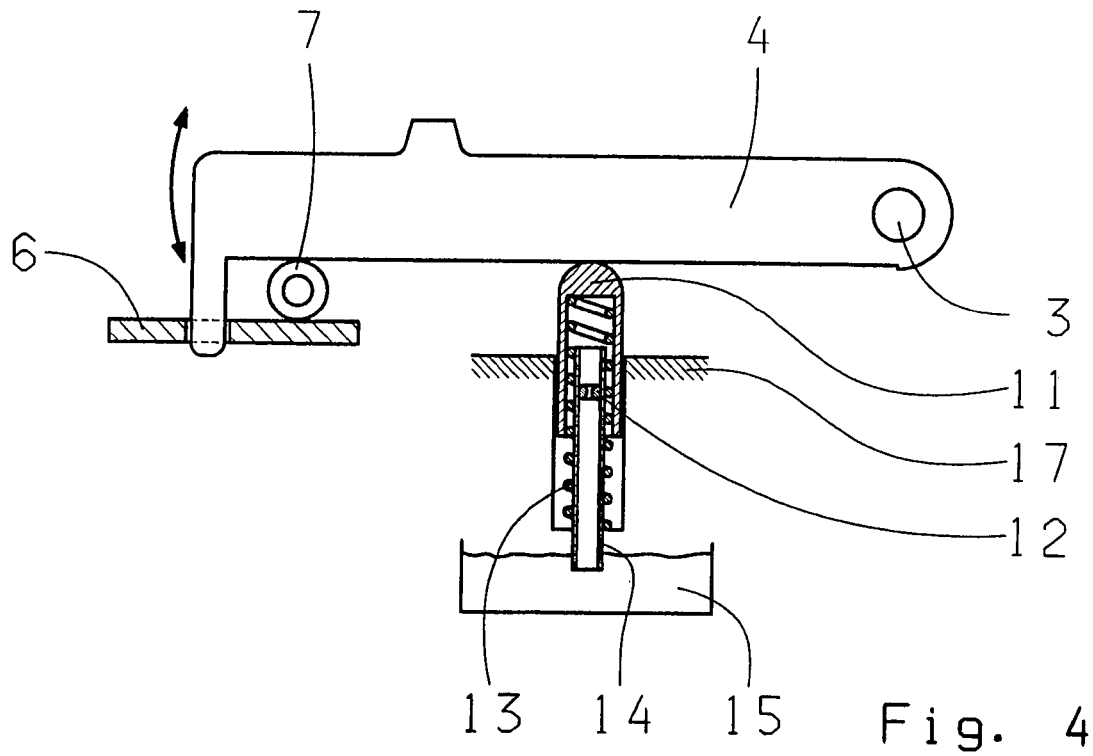
FIG. 4 is a schematic view of a fourth preferred embodiment of the parking lock according to the present invention.

According to FIG. 4 the inventive hydraulic damping element 8 may be in direct operative connection with the locking pawl 4 in an area outside the area of the pivotable end 5. The piston 11 of the hydraulic damping element 8 is directly, shiftably located directly in a bore serving as cylinder 9 in the housing 17 below the side of the locking pawl 4 facing the guiding plate 6. In this case, the end of the piston 11 facing the locking pawl 4 preferably has a spherical and/or convex contour to facilitate rolling off of the locking pawl 4. In the illustrated example, the orifice 12 is located within the pipe 14. In order to save one component, the orifice 12 and pipe 14 may also be arranged in one piece, for example as a compressed pipe with a constriction along the inside diameter.

Figure 5:
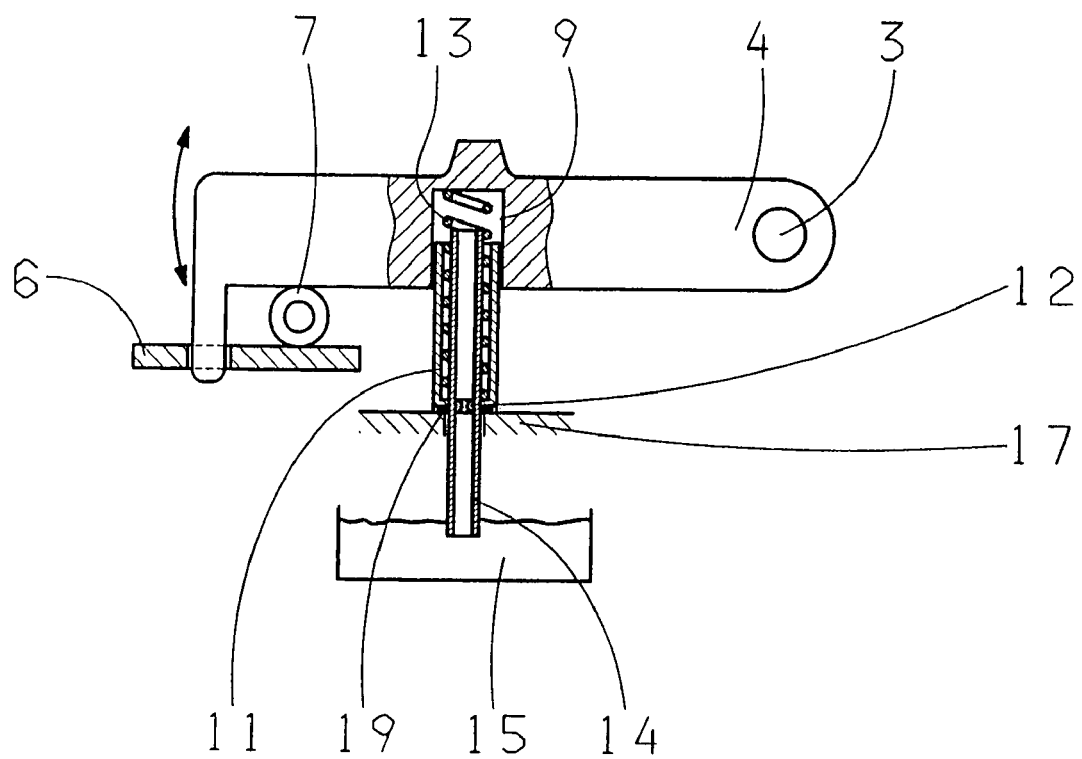
FIG. 5 is a schematic view of a fifth preferred embodiment of the parking lock according to the present invention.

The subject matter of FIG. 5 is an exemplary embodiment, in which the cylinder 9 of the hydraulic damping element 8 is developed as a bore in the parking pawl 4, the piston 11 is supported on the housing 17 below the side of the locking pawl 4 facing the guiding plate 6, and the pipe 14 extends through the housing 17 into the oil sump 15; damping occurs by pushing the cylinder 9 against the piston 11.

A gap 19 is provided at the transition between the pipe 14 and the housing 17 to compensate for axial movement occurring when pivoting the locking pawl 4; alternatively, the pipe 14 may be curved, with the radius of curvature corresponding to the distance between the parking lock bolt 3 and the center of the damping element 8.

The described exemplary embodiments involve damping elements 8, which may be pressurized and generate damping. However, according to the present invention it also is possible to develop and design the hydraulic damping element 8 to be tensile to generate the desired damping. This embodiment is the subject matter of FIGS. 6 and 7.

Figure 6:
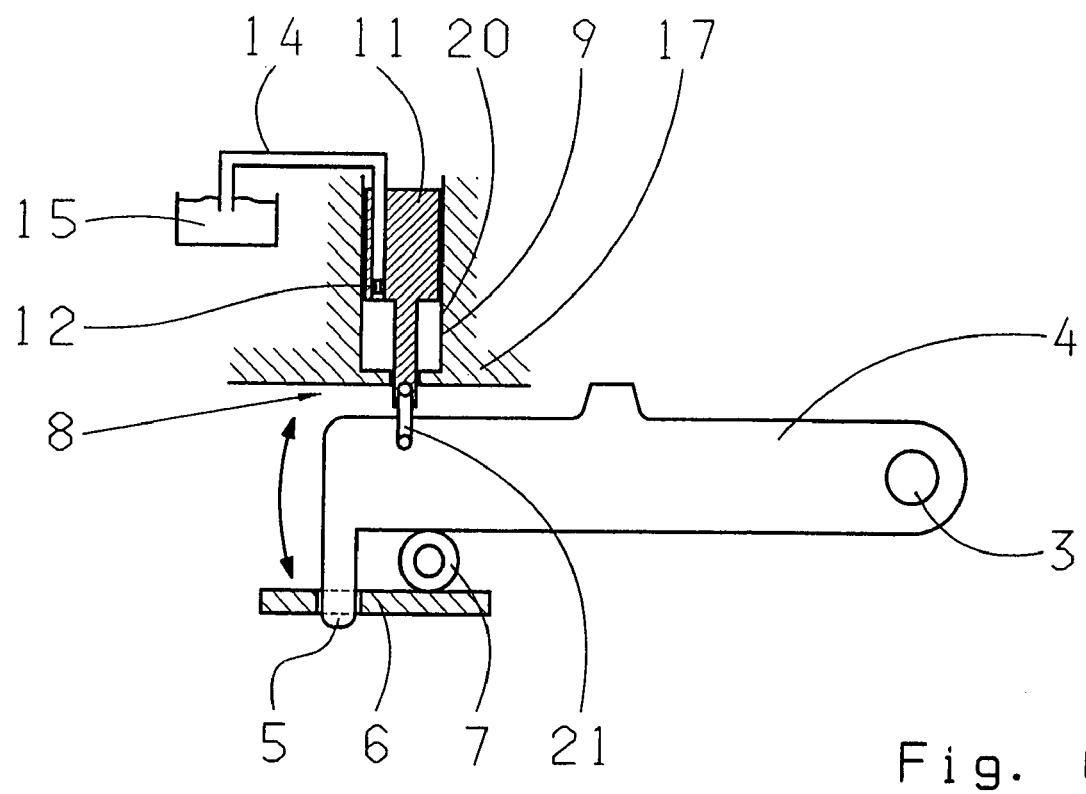
FIG. 6 is a schematic view of a sixth preferred embodiment of the parking lock according to the present invention.

In the exemplary embodiment illustrated in FIG. 6, the piston 11 of the hydraulic damping element 8 slides within a cylinder bore 20 in the housing 17 above the side of the locking pawl 4 opposite the guiding plate, the locking pawl 4 being connected to the piston 11 with a movable and/or pivotable linkage or with a clamp 21. In this case, when the parking lock 1 is disengaged, the piston 11 is pulled downward by the locking pawl 4, such that the oil inside the cylinder 9 and/or cylinder bore 20 is displaced and forced into the oil sump 15 through the pipe 14 and the orifice 12 arranged in the pipe. With the return stroke, the cylinder 9 again fills with oil, while the pipe 14 generates the self-ventilation of the damping element. The connection between the locking pawl 4 and the piston 11 makes a spring inside the damping element 8 unnecessary.

Figure 7:
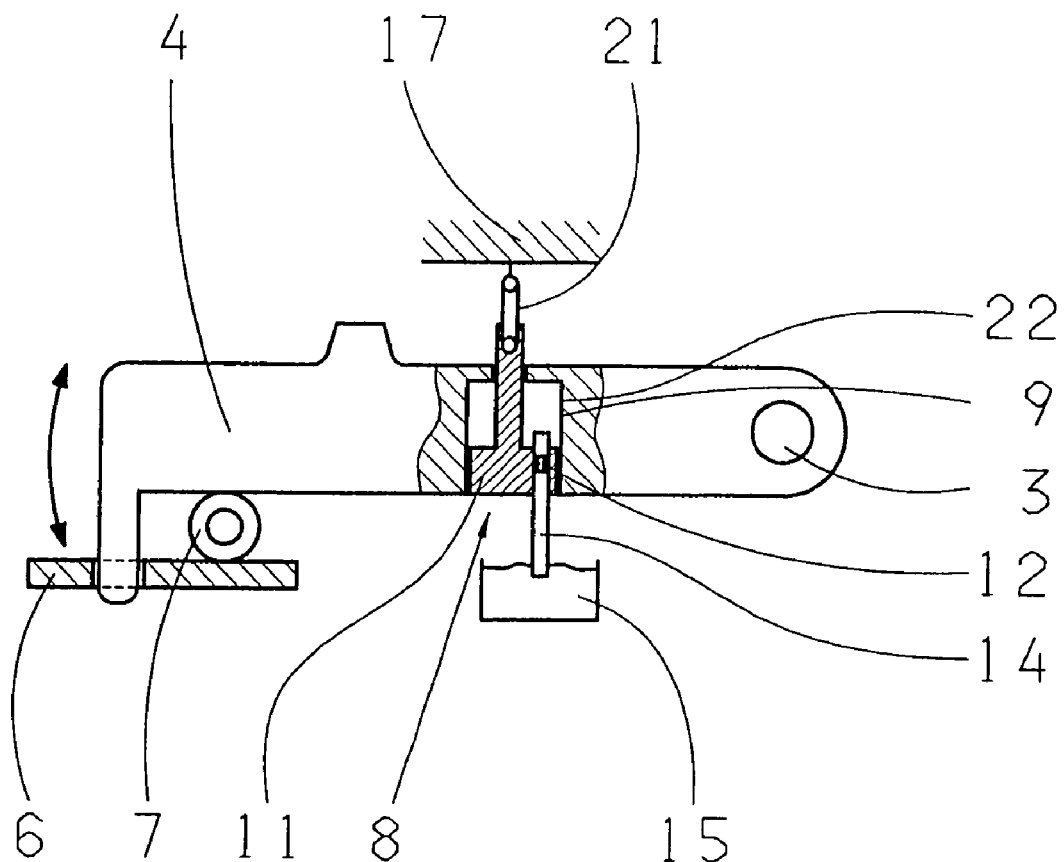
FIG. 7 is a schematic view of a further preferred embodiment of the parking lock according to the present invention.

FIG. 7 displays an exemplary embodiment, in which the piston 11 of the hydraulic damping element 8 is slidably located in a cylinder bore 22 in the locking pawl 4, which functions as a cylinder 9. The piston in this embodiment is connected, via a movable and/or pivotable linkage or a clamp 21, with the housing 17 above the side of the locking pawl 4 opposite the guiding plate 6, which serves as a counter bearing of the piston 11. When the parking lock 1 is disengaged, the locking pawl 4 moves downward against the static piston 11, the oil inside the cylinder 9 being displaced and forced into the oil sump 15 through the pipe 14 and the orifice 12 provided in the pipe 14. For this purpose, the oil sump is located below the side of the locking pawl 4 facing the guiding plate 6; however, it may also be arranged above the side of the locking pawl 4 opposite the guiding plate 6.

According to the present invention, it may also be provided that the pipe 14 does not extend into the cylinder 9; in this case ventilation is achieved by means of further measures.

Figure 8:
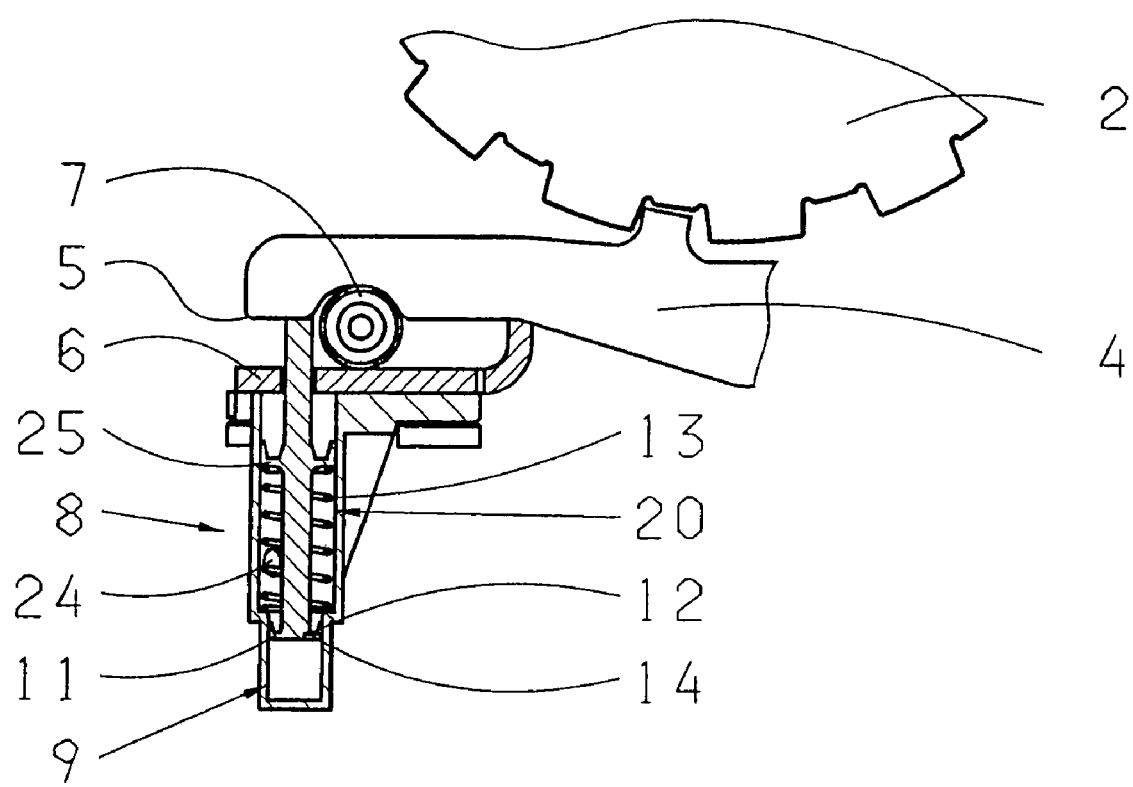
FIG. 8 is a schematic view of a further preferred embodiment of the parking lock according to the present invention.
Figure 9:
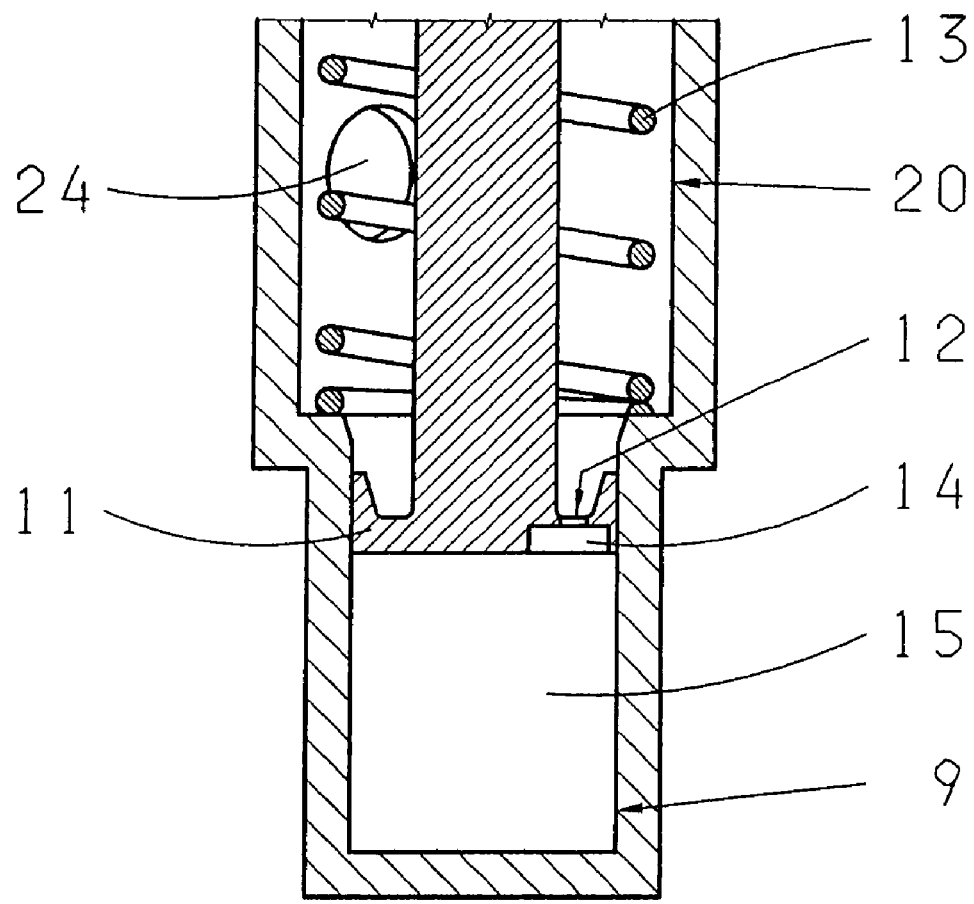
FIG. 9 is a detailed view of the piston and throttling bore according to the embodiment shown in FIG. 8

In FIGS. 8 and 9, an embodiment according to the present invention is illustrated, where the throttling bore 12 of the hydraulic damping element 8 is located on the side of the locking pawl 4 opposite the piston 11, that is moved by the locking pawl 4.

As can be seen from FIGS. 8 and 9, a filling bore 24 is provided in the cylinder bore 20 above the throttling bore 12, by means of which the transmission oil may flow into the damping element 8, such that the oil level reaches the lower edge of this bore 24. The damper housing is closed below the cylinder bore 24. When the transmission oil pump is stalled, the oil level in the transmission is above the cylinder bore 24, ensuring that the cylinder 9 is filled with oil. When the parking lock is engaged, the piston 11 moves from its lowest position upward (i.e. in the direction of the guiding plate 6), via the compression spring 13, and the space in the cylinder 9 below the piston 11 fills with oil, which flows through the throttling bore 12 of the piston 11. The oil volume in the cylinder bore 24 is clearly larger than the volume of the space in the cylinder 9 below the piston 11 when the piston is situated in its highest position. Thus, ensuring operation even when the vehicle is steeply tilted.

When the parking lock is disengaged, the piston 11 is pushed downward by the locking pawl 4; the piston guidance is provided with the reference numeral 25 in FIG. 8. The movement of the piston generates flow of the oil inside the cylinder bore 20 below the piston 11 through the throttling bore 12, thus damping the piston movement, and consequently the movement of the locking pawl 4.

To prevent dirt from entering, the filling bore 24 may be provided with a filter. In the upper part of the cylinder 9 and/or cylinder bore 20 facing the locking pawl 4, a seal may further be provided, e.g. an shaft sealing may be inserted, to prevent dirt from entering the damping element 8.

As an alternative to this embodiment, a separate component may serve as a cover in the upper part of the cylinder and/or cylinder bore facing the locking pawl; for example, the separate component may be made of slide bearing material, preferably plastic, which is pressed into the cylinder and/or the cylinder bore. By pressing in the cover, the compression spring 13 and piston 11 are prevented from being pushed out of the housing prior to being mounted into the transmission. In doing so, the damping element is arranged as a separate module, which advantageously facilitates mounting. In this context, the piston may be designed as one piece or consist of several parts.

In the embodiment illustrated in FIG. 8, the damping element 8 is arranged below the guiding plate 6; it is also possible however to mount and/or provide the damping element 8 on the oil pan situated below the transmission.

Figure 10:
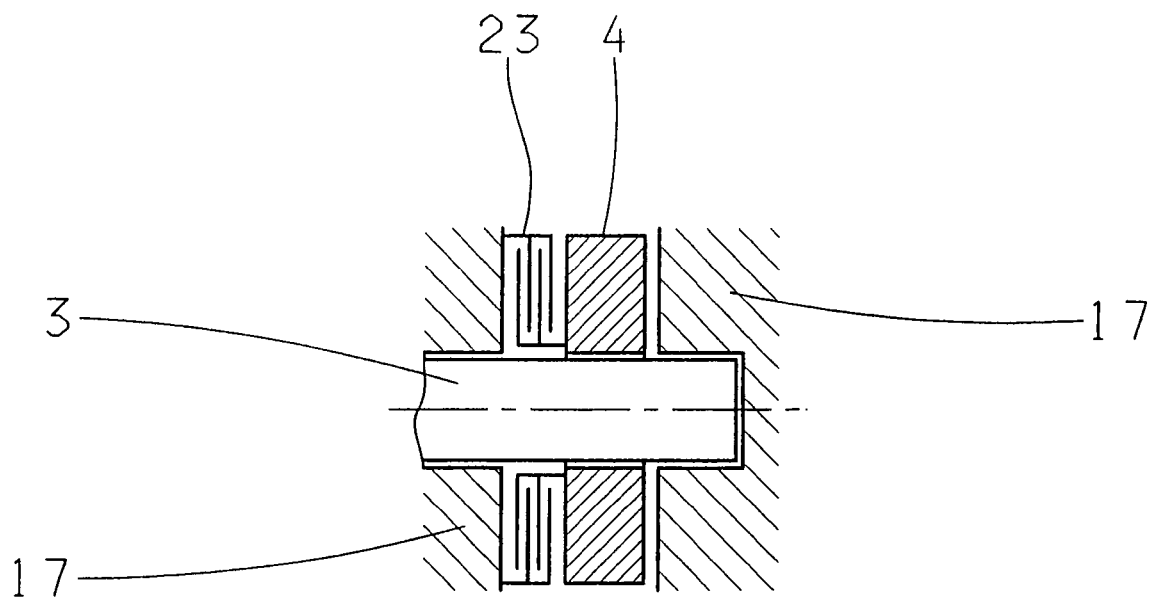
FIG. 10 is a schematic view of a further preferred embodiment of the parking lock according to the present invention.
Figure 11:
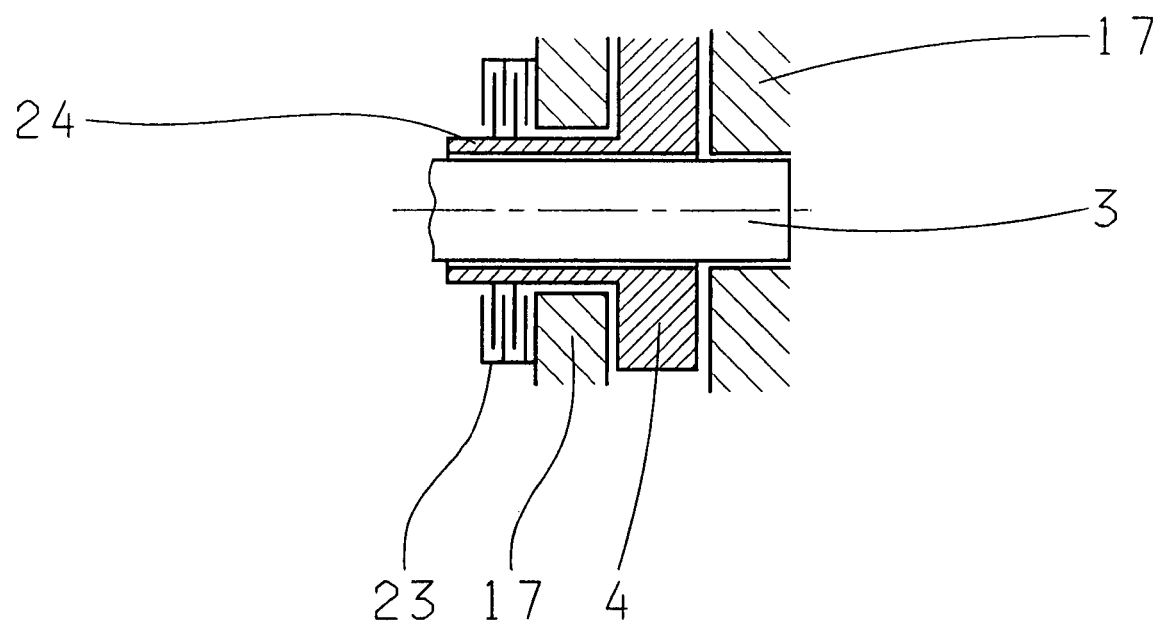
FIG. 11 is a schematic view of a further preferred embodiment of the parking lock according to the present invention.

According to a further especially advantageous embodiment of the parking lock according to the present invention and shown in FIGS. 10 and 11, the damping of movement of the pivotable end 5 of the locking pawl 4 toward the guiding plate 6 when the parking lock 1 is released, is achieved by means of a viscous coupling and/or rotary viscous damper 23.

A rotary viscous damper 23 is used in the area of the parking lock bolt 3, which stops and/or damps the rapid movement of the locking pawl at disengagement, minimizing the "hard" impact of the locking pawl 4 on the guiding plate 6. The viscous rotary damper 23 is firmly connected on one side with the housing 17 and firmly connected on the other side with the locking pawl 4. When the parking lock 1 is engaged, the movement of the parking pawl is significantly slower than when it is disengaged, so that it is not impeded by the viscous rotary damper 23.

The constructions of FIGS. 10 and 11, differ in the spatial arrangement of the viscous rotary damper 23. This rotary damper may be located between the housing 17 and locking pawl 4, as shown in FIG. 10, or on the side of the housing 17 opposite the locking pawl 4 (cf. FIG. 11), in this case, a pawl pivot 24 associates with the viscous rotary damper 23 which is fixed through the housing 17.

Of course, any constructive embodiment, particularly any spatial arrangement of the components of the parking lock and damping element as such, as well as in relation to each other, to the extent they are technically expedient, falls under the scope of protection of the present claims, without influencing the function of the transmission as described in the claims, even if these embodiments are not explicitly illustrated in the FIGS. or mentioned in the description.

REFERENCE NUMERALS

1 Parking lock
2 Parking lock wheel
3 Parking lock bolt
4 Locking pawl
5 Pivotable end of the locking pawl
6 Guiding plate
7 Locking element
8 Hydraulic damping element
9 Cylinder
10 Screw
11 Piston
12 Orifice, throttling bore
13 Compression spring
14 Pipe
15 Oil sump
16 Connecting rod
17 Housing
18 Link
19 Gap
20 Cylinder bore
21 Clamp
22 Cylinder bore
23 Rotary viscous damper
24 Filling bore
25 Piston guidance

The invention claimed is:

1. A parking lock for a motor vehicle with one of an automatic transmission and a manual automatic transmission, the parking lock (1) engaging with a parking lock wheel (2) fixed to a transmission output to prevent rotation of the transmission output, the parking lock comprising:

a locking pawl (4), having a free pivotable end, being pivotably secured to a parking lock bolt (3) in a transmission housing, the locking pawl pivoting to one of engage and disengage the parking lock wheel (2), and the free pivotable end (5) passes through a guiding plate (6) connected to the transmission housing (17);

a locking element (7) being sandwiched between the locking pawl (4) and the guiding plate (6) to retain engagement between the locking pawl (4) and a tooth gap of the parking lock wheel (2) when the parking lock (1) is engaged;

a hydraulic damping element (8) operatively communicates with the locking pawl (4), when the parking lock (1) is disengaged, such that movement of the pivotable end (5) of the locking pawl (4) toward the guiding plate (6) is damped when the parking lock (1) is disengaged so as to prevent a release jolt, the hydraulic damping element (8) comprises a piston (11), which is located in one of a cylinder (9) and a cylinder bore (20, 22) and operatively communicates with the locking pawl (4) such that movement of the locking pawl (4), toward the guiding plate (6), biases the piston (11) against oil, located within at least one of the cylinder (9) and the cylinder bore (20, 22), the oil being displaced into an oil sump (15) through a pipe (14) and an orifice (12) to restrict the flow of oil to the oil sump (15) to provide a damping effect on the movement of the locking pawl (4) toward the guiding plate (6).

2. The parking lock according to claim 1, wherein dimensions of the orifice (12) determine an extent of the damping effect of the hydraulic damping element (8).

3. The parking lock according to claim 1, wherein the pipe (14) is a self-ventilating pipe which is coupled with the cylinder (9) by a screw (10).

4. The parking according to claim 1, wherein, when the parking lock (1) is disengaged, a volume of the oil expelled by the piston (11) is greater than a volume within the pipe (14).

5. The parking lock according to claim 1, wherein the orifice is a throttling bore (12) and is one of located in the pipe (14), bored directly into the cylinder (9) and located on a screw (10), which couples the pipe (14) to the one of the cylinder (9) and the cylinder bore (20, 22).

6. The parking lock according to claim 1, wherein if the piston (11) is not coupled the locking pawl (4), then the hydraulic damping element (8) includes a pressure spring (13) which biases the piston (11) against the movement of the locking pawl (4) toward the guiding plate (6) so as to enable the oil from the oil sump (15) to flow into the one of the cylinder (9) and the cylinder bore (20, 22), when the parking lock (1) is engaged.

7. The parking lock according to claim 1, wherein the transmission housing (17) is located below the guiding plate (6) and the cylinder (9) is fixed to the housing (17).

8. The parking lock according to claim 7, wherein the pivotable end (5) of the locking pawl (4) is convex.

9. The parking lock according to claim 1, wherein the piston (11) is coupled to the locking pawl (4) by a pivotable connection rod (16) and clearance free links (18), the piston (11) is reciprocatively slidable in the cylinder (9), the cylinder (9) is one of a bore in the housing (17) and a separate cylinder (9) fixed to the housing (17) below a side of the locking pawl (4) facing the guiding plate (6).

10. The parking lock according to claim 1, wherein the piston (11) operatively communicates with the locking pawl (4) at a location of the locking pawl (4) remote from the pivotable end (5), the piston (11) is reciprocatively slidable in the cylinder (9), the cylinder (9) is a bore in the housing (17) below a side of the locking pawl (4) facing the guiding plate (6), and an end of the piston (11) communicating with the locking pawl (4) has at least one of a spherical contour and a convex contour to facilitate rolling off of the locking pawl (4).

11. The parking lock according to claim 1, wherein the cylinder (9) is a bore in the locking pawl (4), the piston (11) is supported by the housing below a side of the locking pawl (4) facing the guiding plate (6), the pipe (14) extends through the housing (17) and the damping effect achieved by the locking pawl (4) presses the cylinder (9) against the piston (11).

12. The parking lock according to claim 11, wherein a gap (19) is located between the pipe (14) and the housing (17) to compensate for any axial movement caused by pivoting of the locking pawl (4).

13. The parking lock according to claim 1, wherein the pipe (14) is arcuate with a radius of curvature corresponding to a distance between the parking lock bolt (3) and a center of the damping element (8) to compensate for any axial movement caused by pivoting of the locking pawl (4).

14. The parking lock according to claim 1, wherein the piston (11) is reciprocatively slidable within the cylinder bore (20) which is located in the housing (17) above a side of the locking pawl (4) opposite the guiding plate (6), the locking pawl (4) is coupled to the piston (11) by a clamp and at least one of a movable linkage and a pivotable linkage (21), the damping effect achieved by the locking pawl (4) pulling the piston (11).

15. The parking lock according to claim 1, wherein the piston (11) is reciprocatively slidable within the cylinder bore (22) which is located within the locking pawl (4), the cylinder bore (22) functions as the cylinder (9), the piston (11) is coupled, via a clamp and at least one of a movable linkage and a pivotable linkage (21), to the housing (17) which is above a side of the locking pawl (4) opposite the guiding plate (6), the oil sump (15) is located below a side of the locking pawl (4) facing the guiding plate (6), and the damping effect achieved by the locking pawl (4) presses the cylinder (9) against the piston (11) coupled to the housing (17).

16. A parking lock for a motor vehicle with one of an automatic transmission and a manual automatic transmission, the parking lock (1) engaging with a parking lock wheel (2) fixed to a transmission output to prevent rotation of the transmission output, the parking lock comprising:

a locking pawl (4), having a free pivotable end (5), being pivotably secured to a parking lock bolt (3) in a transmission housing, the locking pawl (4) pivoting to one of engage and disengage the parking lock wheel (2), the free pivotable end (5) passes through a guiding plate (6) connected to the transmission housing (17);

a locking element (7) being sandwiched between the locking pawl (4) and the guiding plate (6) to retain engagement between the locking pawl (4) and a tooth gap of the parking lock wheel (2) when the parking lock (1) is engaged;

a hydraulic damping element (8) operatively communicates with the locking pawl (4), when the parking lock (1) is disengaged, such that movement of the pivotable end (5) of the locking pawl (4) toward the guiding plate (6) is damped when the parking lock (1) is disengaged to prevent a release jolt, the hydraulic damping element (8) comprises a piston (11), which is located in one of a cylinder (9) and a cylinder bore (20, 22) and operatively communicates with the locking pawl (4) such that movement of the locking pawl (4), toward the guiding plate (6), results in relative movement of the piston (11) toward the one of the cylinder (9) and the cylinder bore (20), the piston having a throttling bore (12) on a side opposite the locking pawl (4), and the cylinder bore (20, 22) having a filling bore (24), located above the throttling bore (12), enabling oil to flow into at least one of the cylinder (9) and the cylinder bore (20, 22) such that a throttling effect of the throttling bore (12) dampens movement of the piston (11).

17. The parking lock according to claim 16, wherein dimensions of of the throttling bore (12) determine an extent of the damping effect of the hydraulic damping element (8).

18. The parking lock according to claim 16, wherein the filling bore (24) has a filter to prevent passage of dirt through the filling bore (24).

19. The parking lock according to claim 16, wherein a seal is provided in a upper part of at least one of the cylinder (9)

and the cylinder bore (20) facing the locking pawl (4) to prevent dirt from entering the damping element (8).

20. The parking lock according to claim 16, wherein a separate component is provided, as a cover, in an upper part of at least one of the cylinder (9) and cylinder bore (20) facing the locking pawl (4).

21. The parking lock according to claim 20, wherein the separate component is made of slide bearing material and pressed into at least one of the cylinder (9) and the cylinder bore (20).

22. The parking lock according to claim 20, wherein the damping element (8) is a separate module.

23. The parking lock according to claim 16, wherein if the piston (11) is not coupled the locking pawl (4), then the hydraulic damping element (8) includes a pressure spring (13) which biases the piston (11), against the movement of the locking pawl (4), toward the guiding plate (6), which causes the piston (11) to be shifted outward when the parking lock (1) is engaged.

* * * * *